United States Patent
Kipnes

(10) Patent No.: US 7,941,932 B2
(45) Date of Patent: May 17, 2011

(54) COMPACT ERGONOMIC THREAD INSPECTION TOOL

(76) Inventor: Hyman Jack Kipnes, Hauppauge, NY (US)

(*) Notice: Subject to any disclaimer, the term of this patent is extended or adjusted under 35 U.S.C. 154(b) by 0 days.

(21) Appl. No.: 12/657,466

(22) Filed: Jan. 21, 2010

(65) Prior Publication Data

US 2010/0186242 A1  Jul. 29, 2010

Related U.S. Application Data

(63) Continuation-in-part of application No. 12/220,284, filed on Jul. 23, 2008, now Pat. No. 7,661,196.

(51) Int. Cl.
G01B 5/14 (2006.01)
G01L 5/24 (2006.01)

(52) U.S. Cl. .............. 33/199 R; 73/761; 73/862.23

(58) Field of Classification Search .......... 33/199 R; 73/761, 862.21, 862.22, 862.23, 862.321; 81/52

See application file for complete search history.

(56) References Cited

U.S. PATENT DOCUMENTS

| | | | | |
|---|---|---|---|---|
| 3,638,479 A * | 2/1972 | Boutet | ...... | 73/761 |
| 4,926,700 A * | 5/1990 | Peplinski | ...... | 73/862.23 |
| 7,059,055 B2 * | 6/2006 | Wickham et al. | ...... | 33/199 R |
| 7,484,427 B2 * | 2/2009 | Kolkind | ...... | 73/862.23 |
| 7,661,196 B1 * | 2/2010 | Kipnes | ...... | 33/199 R |
| 2008/0028623 A1 * | 2/2008 | Lange et al. | ...... | 33/199 R |
| 2009/0078057 A1 * | 3/2009 | Schultz et al. | ...... | 73/862.23 |

* cited by examiner

Primary Examiner — G. Bradley Bennett
(74) Attorney, Agent, or Firm — Alfred M. Walker

(57) ABSTRACT

An ergonomic, self contained hand-held thread inspection tool is power driven, which uses a mechanical clutch as a surrogate for torque to initiate automatic reversal and gauge withdrawal in case of jamming. The distal end carries the thread gauge attached to a motor-driven spindle. A thread depth collar sleeve, adjustable by manual turning, concentrically surrounds the thread gauge. When threaded into a blind hole or onto a protruding stud and operated, the distal end of the thread depth collar sleeve comes in contact with a part, pushing it against spring force. This movement is internally sensed, causing an indicator to flash, signaling "test OK", while automatically reversing the spindle to withdraw the thread gauge. If during the forward excursion of the thread gauge a torque exceeding the pre-set torque limit is encountered, a buzzer is sounded signaling an over-torque problem and the spindle is simultaneously reversed for automatic gauge withdrawal.

15 Claims, 10 Drawing Sheets

OPERATION

CALIBRATION

COMPACT ERGONOMIC THREAD INSPECTION TOOL

RELATED APPLICATIONS

This application is a continuation-in-part of application Ser. No. 12/220,284 filed Jul. 23, 2008 now U.S. Pat. No. 7,661,196 and claims priority in part pursuant to 35 U.S.C. §120 therefrom. That application is incorporated by reference herein.

FIELD OF THE INVENTION

The present invention relates to portable thread inspection tools.

BACKGROUND OF THE INVENTION

Thread inspection is a necessary part of many manufacturing or quality control procedures. It involves the spinning of externally or internally threaded gauges into threaded holes or onto threaded studs respectively. These threaded holes or studs may be integral parts of machines or perhaps just fastener parts such as nuts or bolts. Power driven spindles on which gauges are fitted to facilitate rapid and uniform testing are used.

The prior art includes U.S. Pat. No. 4,926,700 of Peplinski for a blind hole thread gauge using a modified commercial nut driver. This bench mounted device uses strain gauges to monitor torque during testing, as well as sensing when a given hole has been tested to its proper depth. U.S. Pat. No. 7,059,055 of Wickham et al. is a commercial tester for checking thread presence in blind holes rapidly. Both single spindle and multi-spindle devices are described using adjustable slip clutches to limit the torque applied during testing. Upon detecting the proper depth of testing or upon exceeding the torque limit, the tester automatically reverses the drive motor to disengage the gauge from the hole being tested.

Additionally, Peplinski '700 uses an electrical contact at the distal end, which closes a circuit when it touches the machine part. This electrical contact is rotated with the gauge, causing possible abrasion at the point of moving contact.

The prior art does not reveal a compact hand-held ergonomic thread inspection tool that is power driven, and uses a mechanical clutch as a surrogate for torque to initiate either automatic withdrawal or alert the user to operate the reversing switch manually in case of jamming.

The prior art also shows the compact hand-held manual adjustable torque thread gauge of Kolkind (U.S. Pat. No. 7,484,427). This interposes an adjustable magnetic torque limiting clutch between the handle, which is manually rotated, and the thread gauge at its front end.

OBJECTS OF THE INVENTION

It is an object of the present invention to provide a compact hand-held ergonomic thread inspection tool that is power driven, which uses current draw or a mechanical clutch as a surrogate for torque to initiate automatic reversal and gauge withdrawal in case of jamming.

Other objects which become apparent from the following description of the present invention.

SUMMARY OF THE INVENTION

In keeping with these objects and others which may become apparent, the present invention is a thread inspection tool which is configured as a hand-held cylindrical housing that is self-contained, including a compartment for rechargeable batteries to power the motor-driven spindle. An optional AC sourced power supply and battery charger can alternatively supply the low voltage DC power to run the thread checker via DC power cord and also simultaneously charge the batteries (if installed).

A transparent panel on the inspection tool protects adjustment switches from inadvertent operation while permitting a view of a small display showing the current torque limit setting. It can be opened to provide access to the torque adjusting switches and the metric/English units switch. Once the desired torque limit is set, any number of threaded holes, blind threaded holes, or threaded studs or bolts can be checked using the same setting.

The distal end carries the thread gauge attached to a motor-driven spindle. As an ergonomic feature, a thread depth collar sleeve, simply adjustable by manual turning, concentrically surrounds the thread gauge. When threaded into a blind hole or onto a protruding stud and operated, the distal end of the thread depth collar sleeve comes in contact with machine part pushing it in slightly against light spring force. This movement of less than a pre-determined threshold, such as, for example, 1/32" or otherwise, is internally sensed, causing an indicator to flash, signaling "test OK", while automatically and simultaneously reversing the spindle to withdraw the thread gauge. If during the forward excursion of the thread gauge a torque exceeding the pre-set torque limit is encountered, a buzzer is sounded signaling an over-torque problem (such as a thread jam); the spindle is simultaneously reversed by either automatic gauge withdrawal or by using the reversing switch manually. Note that when a spindle is automatically reversed either due to a thread depth limit or an over-torque indication, this reverse spindle powering is performed with full torque available since the torque limit sensing is defeated during this reverse excursion.

Since both right-hand as well as left-hand threads require inspection, the operating switch for starting the spindle turning is direction sensitive. It is, for example of one type of switch, a momentary type rocker switch, which responds to pressing the forward end by turning the spindle clockwise while pressing the rearward end causes counterclockwise rotation. Other types of switches may be used, such as toggle, slide or membrane switches. The orientation of the switch can be either front to back or side to side switch A momentary switch is used to require the operator to continually press on the switch to keep the spindle moving (even through automatic reversal) as a safety feature. The spindle will stop when pressure is removed from the rocker switch. The switch can also be used for manual reversal of the spindle motor at any time.

A DC permanent magnet gearmotor is used to turn the spindle at a slow speed, such as, for example, 150 to 200 rpm, or other desired slow speeds. This type of motor has a torque constant expressed simply in terms of oz-in/amp or N-m/amp at the motor shaft. The torque at the output of the gear box (which spins the gauge spindle) can be deduced from current draw of the motor by simply reading the current, applying the torque constant, and then multiplying by the reciprocal of the gearbox speed reduction ratio (GBR). This works well when the torque to be detected is large as compared to the parasitic no-load and running torque introduced by internal gearbox friction and lubrication viscous losses. In fact, the GBR and the motor torque constant remain stable over the life of inspection tool, and they are factors well known at gearmotor manufacture. Another constant defined here is the motor torque factor (MTF) which is the reciprocal of the motor torque constant. In addition, other relevant gear box and motor parameters are defined. By testing a number of manufactured gearmotors in a laboratory setting and averaging the results, an estimate of the gear box friction factor (GBF) as well as an additive current factor representing no-load torque (AF) can be obtained. In the preferred embodiment, the desired torque limit is combined with the other factors mentioned to better approximate the detected motor current truly representative of the desired torque limit. These constant parameters are combined in an algorithm with the desired torque to arrive at the current estimate as follows:

$$\text{limit current}=(GBR \times GBF \times MTF \times \text{Desired torque})+AF$$

Then the motor current is continuously measured and compared with this limit current value to determine if the desired torque limit at the thread gauge is exceeded.

In an alternate embodiment with extended low-end thread inspection range, the effects of the gear box are more precisely estimated in the field by establishing a built-in calibration subsystem and procedure. The GBF and AF factors are determined by the calibration procedure and then updated in the limit current algorithm used during actual inspection testing. By pressing a calibrate button and running the spindle with no load in the desired direction, the actual AF current value is measured. Since AF is correlated with GBF as per actual empirical trials by sampling and testing a number of sample units, a better estimate of GBF is obtained from an empirical table stored at the thread inspection tool as retrieved using the measured AF as an index into the table. One variable that affects gear box factors is temperature, another is gear tooth wear. Both of these variables are compensated by a periodic field calibration procedure.

As an alternative to using an algorithm to account for factors, a simple table look-up procedure using desired torque limit as an index to find estimated current can be used. If a calibration procedure is used with such a system, the calibration would enter different updated table entries derived from factory testing. These values are retrieved as a vector using the measured AF as an index.

Although space for electronic controls is limited within the inspection tool of this invention, the use of a single chip appliance grade microcomputer can substitute for discrete logic components and other peripheral chips saving board space as well as cost. In addition, the use of a flexible polyimide board substrate can extend available board area by using the curved area adjacent to the inner housing wall.

In summary, a handheld or a table countertop mounted precision thread inspection tool includes a portable, compact held elongated housing having a distal end and a proximate end. A thread gauge protrudes from the distal end of the housing. A means is provided for setting a length of the thread gauge extending from the distal end of the housing. A drive for the thread gauge includes an electric motor in the housing and a coupling between the motor and the thread gauge.

Torque produced by the electric motor as the gauge is driven into a blind hole or onto a stud is monitored. when a predetermined limit of torque is exceeded, an alarm is set off and automatically the direction of rotation of the thread gauge is reversed.

Preferably, the torque is monitored by monitoring current draw of the motor, which may be, for example, a DC permanent magnet gearmotor. The current draw limit is related to the predetermined torque limit by incorporating empirically determined gear box parameters, such as gear box ratio (GBR), gear box friction factor (GBF), and an additive factor (AF) in addition to the motor torque constant.

Optionally, the housing of the thread inspection tool includes a collar threaded into the distal end of the housing, wherein the thread gauge is mounted within the collar and is fixed along a longitudinal axis of the housing, whereby the length of thread gauge protruding out of the housing is set by manual rotation of the collar.

The housing of the thread inspection tool preferably has a mid-section with a transparent cover containing a display and switches for setting the predetermined limit of torque for forward spinning of the thread gauge.

The collar of the thread inspection tool is preferably part of a sub-system mounted in the distal end of the housing, such that the sub-system is movable along the longitudinal axis of the housing and biased in a forward direction, toward the distal end of the housing. The housing has a sensor, such as, for example, a snap action switch, an optical sensor or a Hall effect switch, which detects when the sub-system overcomes the bias and is moved rearwardly a predetermined distance indicating that the thread gauge no longer has forward movement, because the thread gauge has moved fully into the blind hole or onto the stud. Moreover, the housing has an indicator light which flashes when a thread test is successful. The spindle is simultaneously reversed by either automatic gauge withdrawal or by using the reversing switch manually.

The housing preferably has a momentary rocker switch for controlling operation of the motor, and preferably includes a battery as a power source for the motor, with a socket for recharging the battery or for operating the motor. Other types of switches may be used, such as toggle, slide or membrane switches. The switch can be either a front to back switch or side to side switch.

The coupling between the motor and thread gauge preferably includes a spindle having a coupling. The thread gauge includes a thread portion and a coupling portion, wherein the coupling portion of the thread gauge engages with the spindle coupling in such a manner that the thread gauge is readily replaceable with a different thread gauge.

An optional field calibration procedure including pressing the rocker switch in a predetermined direction while a calibrate switch is on. This procedure obtains an actual no-load current reading at any desired time, whereafter the no-load current reading is then converted to a digital value representing a factor AF in an algorithm associated with each current reading. The field calibration procedure also uses the no-load current reading to retrieve an accurate the gear box friction factor (GBF) for the algorithm from a stored table of empirical values.

An optional table mount accessory for convenient benchtop use of the hand-held thread inspection tool of this invention is also described. It includes a base with a split round clamp attached which receives the housing of the thread inspection tool and locks it in place via a tightening screw with a knob. An adjustable rest in registration with the front end of the thread inspection tool can then be used to support the threaded unit under test.

In an alternate embodiment, the ergonomic depth adjusting subsystem of the previous embodiment is incorporated into a compact thread inspection tool which uses an adjustable mechanical clutch to limit the torque applied to the thread gauge, instead of using the monitoring of motor current to implement that feature as discussed in the first embodiment.

In this mechanical clutch embodiment, the housing also includes a collar threaded into the distal end of the housing. The thread gauge is mounted within the collar and fixed along a longitudinal axis of the housing, whereby the length of the thread gauge protruding out of the housing is set by manual rotation of the collar.

The sequence of operation for the version with a mechanical clutch starts with pressing a membrane or other switch for a desired rotation. The operator continues pressing the membrane or other switch during the inspection cycle. If the mechanical clutch slips, torque is exceeded and the user depresses the return on switch, thereby reversing the motor manually.

Alternatively, when the part being inspected reaches the adjustable depth reversing stop, the adjustable depth reversing stop, locking nut and depth control sleeve engages the reversing switch, which activates a reversal of rotation of the thread gauge, illuminating the reverse rotation indicating light. Alternatively, when inspection of the part being inspected is complete, removing pressure on the membrane switch or other switch will automatically reset the tool. Optionally an alarm may be set off and reversal of direction of the thread gauge occurs when a length setting limit is reached.

BRIEF DESCRIPTION OF THE DRAWINGS

The present invention can best be understood in connection with the accompanying drawings. It is noted that the invention is not limited to the precise embodiments shown in drawings, in which:

FIG. 6 is a crossectional view of the area layout for electronics using flexible polyimide board extensions;

DETAILED DESCRIPTION OF THE INVENTION

Figure 1:
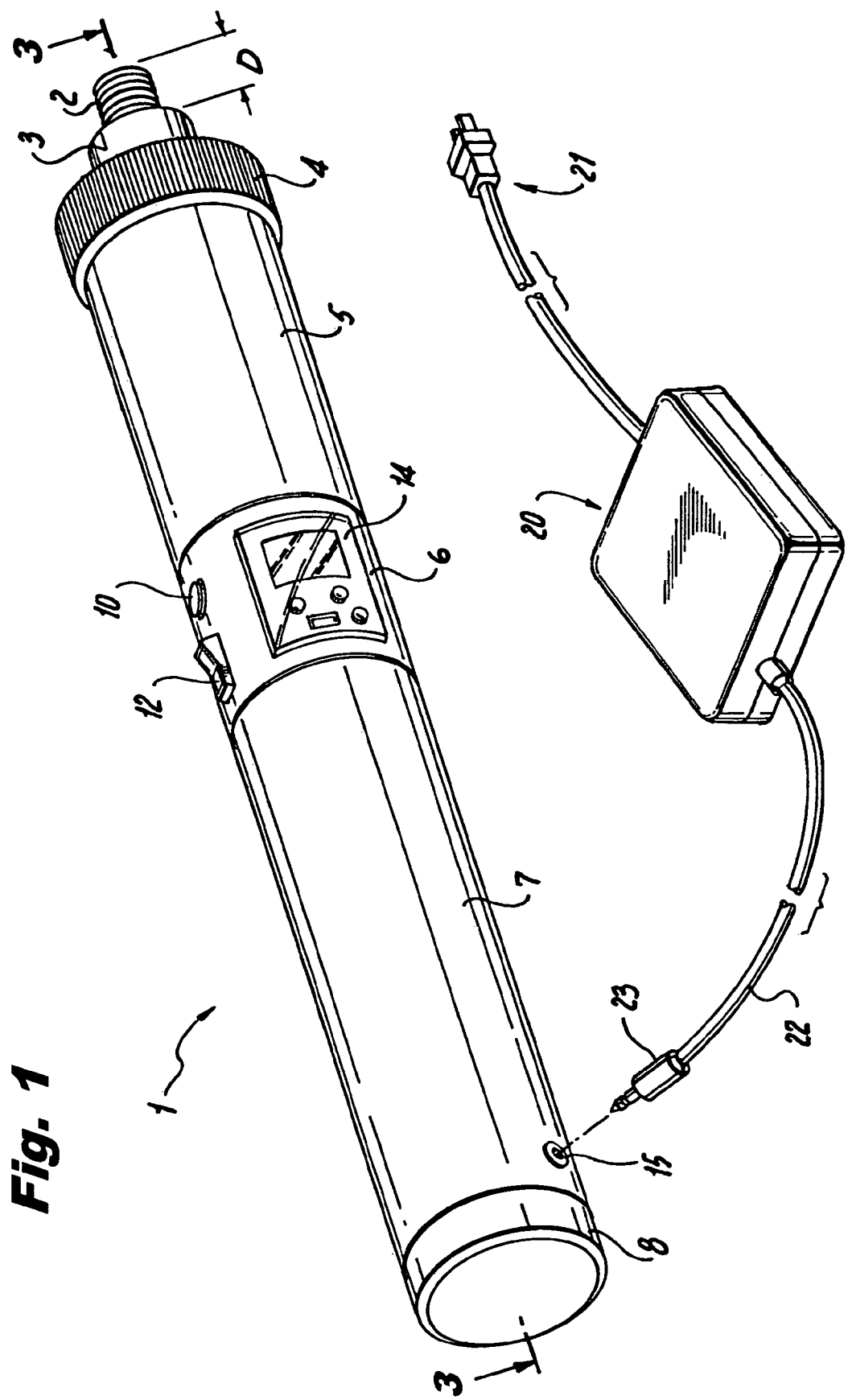
FIG. 1 is a perspective view of the thread inspection tool of this invention; also shown is optional AC sourced DC power supply and charger.

FIG. 1 shows the thread inspection tool 1 of this invention. Thread gauge 2 is surrounded by depth limit collar 3 shown at a setting of "D". Item 4 is a lock nut which locks the internal parts of the depth setting subsystem located within front housing section 5 which screws into mid housing 6 which also contains electronics. Transparent cover 14 covers a liquid crystal display as well as switches which set the torque limit for forward spinning of gauge 2; it is opened to make torque changes. Momentary rocker switch 12 controls spinning of the gauge spindle while flashing indicator light 10 denotes a successful thread test. Other types of switches may be used, such as toggle, slide or membrane switches. The switch orientation can be either a front to back switch or side to side switch. Housing compartment 7 contains the motor, such as a gearmotor as well as a power source, such as one or more batteries, to power the inspection tool. Cap 8 permits access to batteries within. Optional socket 15 mates with DC power plug 23 on DC line 22. This supplies low voltage DC, typically 12 volts, from power supply/charger 20 which is optional. Charger 20 can charge batteries in housing 7 using plug-in AC (21) power, or it can power tool 1 directly even with batteries removed.

Figure 2:
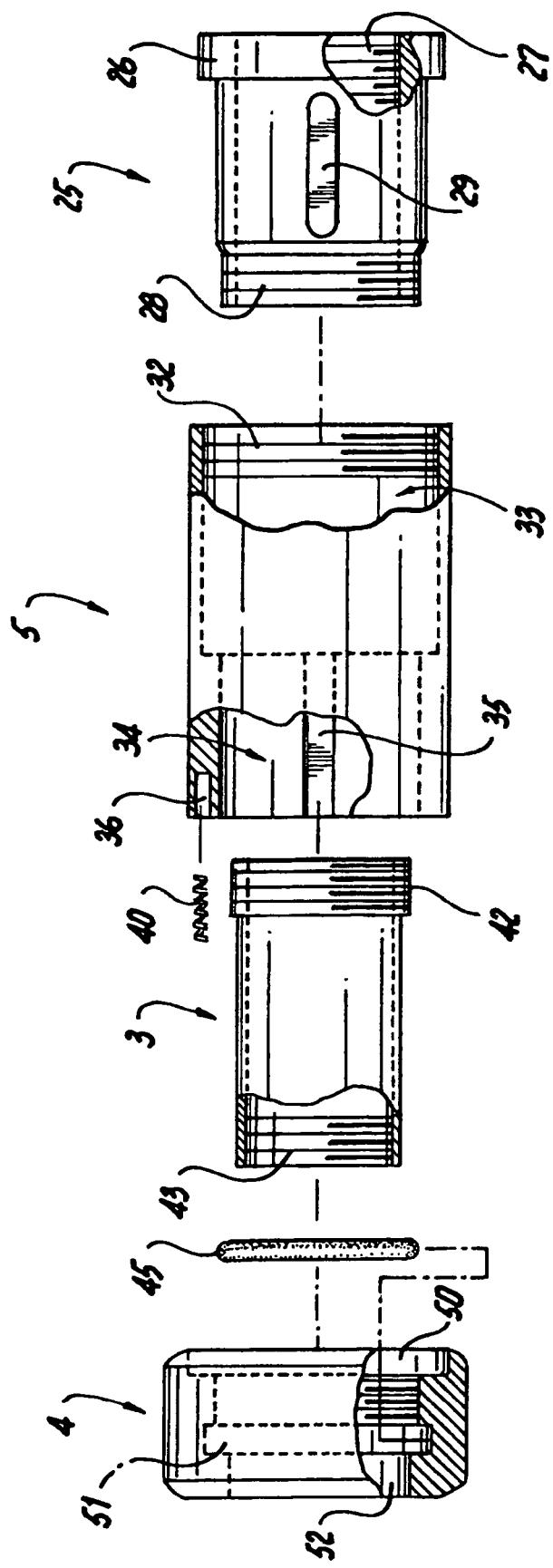
FIG. 2 is a side exploded view of the depth adjusting subsystem.
Figure 3:
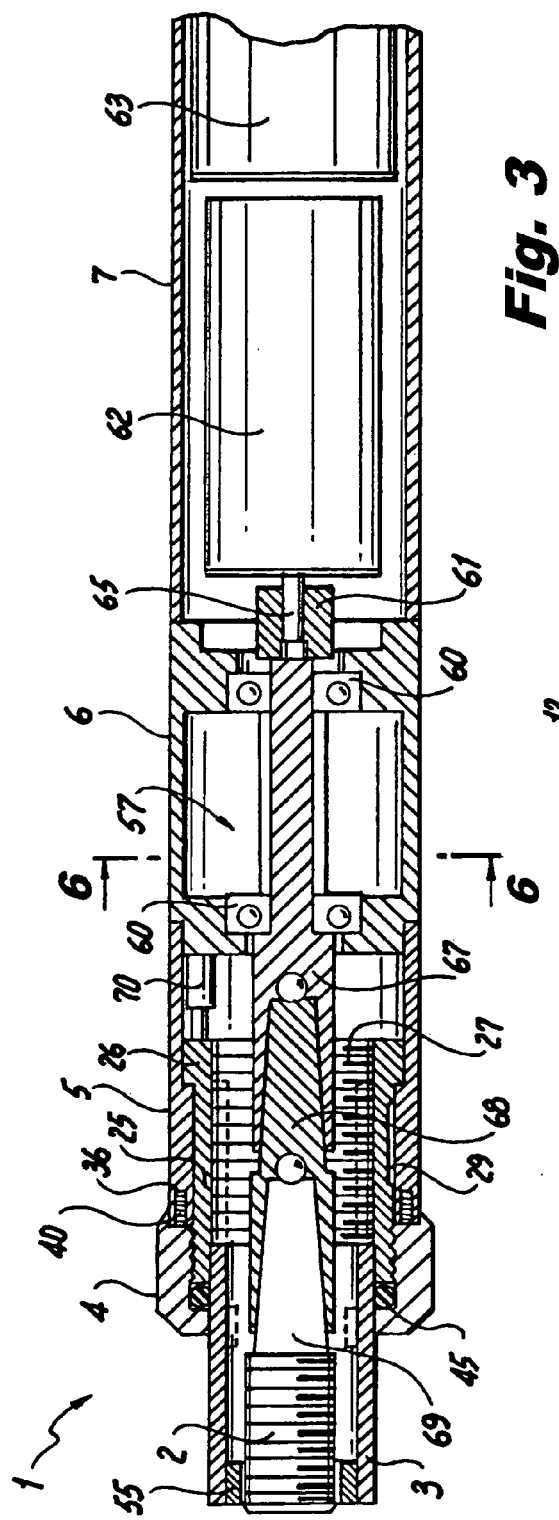
FIG. 3 is a side crossectional view showing the mechanical components.

FIGS. 2 and 3 should be viewed together for better understanding. FIG. 2 shows the depth setting subsystem including several concentric hollow parts. Internal sleeve 25 has a collar 26 at its distal end, internal threads 27 for its entire length, external threads 28 at the front end, and preferably a protruding anti-rotation member, such as key 29. This fits inside housing section 5 when key 29 is in registration with internal groove 35 of housing 5 and rests with collar 26 against ridge formed by reduced diameter section 34. Internal threads 32 attach housing 5 to housing 6 section. Depth limit collar 3 has external threads 42 which engage the internal threads 27 of sleeve 25. Preferably a friction reducer, such as rubber O-ring 45 is a stretch fit onto collar 3 and also fits within region 51 of lock nut 4 with exit hole 52 permitting access for the end of collar 3. A spring ferrule can be used as a substitute for O-ring 45, thereby serving the same function. Biasing members, such as, for example, two or more small springs 40, are partially retained within radially equi-spaced holes 36 in the front end of housing section 5. They bias the subassembly including of internal sleeve 25, collar 3, O-ring 45 and lock nut 4 forward under light spring force relative to housing 5 (after lock nut 4 is tightened). If collar 3 is pressed back relative to housing 5, it can move a predetermined distance, such as, preferably, about 1/32" or other suitable distance; this is enough to trip a switch, such as, for example, snap action switch 70 (see FIG. 3). An optical sensor or a Hall-effect sensor can be used as a replacement for switch 70, but in any event the objective is to sense the movement of collar 26. FIG. 3 also shows ring 55 which can be screwed into internal threads 43 of depth limit collar 3 to provide an end surface more closely fitted around the outer diameter of gauge 2. Note that collar 3 in use is non marring to the surface on which it impinges since it requires little force and it is non-rotating. Note that the use of O-ring 45 provides an optimal amount of friction when manually turning depth limit collar 3; it is easy to turn while having enough friction to maintain a setting during use.

In FIG. 3, the end of battery pack 63 is shown in a portion of housing 7 behind gearmotor 62. The shaft 65 of gearmotor 62 engages coupling 61 which engages spindle shaft 67 carried in retainers, such as two ball bearings 60, one at each end of housing section 6. The front end of spindle 67 opens into an integral female taper coupling. Note area 57 is shown empty, this is where the electronic subassembly is preferably housed. An intermediate coupling 68 is preferably used, having a male taper coupling which mates with that integral to spindle shaft 67. The front female taper of coupling 68 may be different to accommodate whatever male taper is integral to gauge 2. Intermediate coupling 68 is therefore a conversion coupling. Many different such couplings are provided as needed. Lateral holes to facilitate disengagement rods are shown at the apex of female taper couplings. The entire depth limit subassembly can be unscrewed from housing 6 intact and pulled forward of gauge 2 to facilitate changing gauges and/or conversion couplings.

Figure 4:
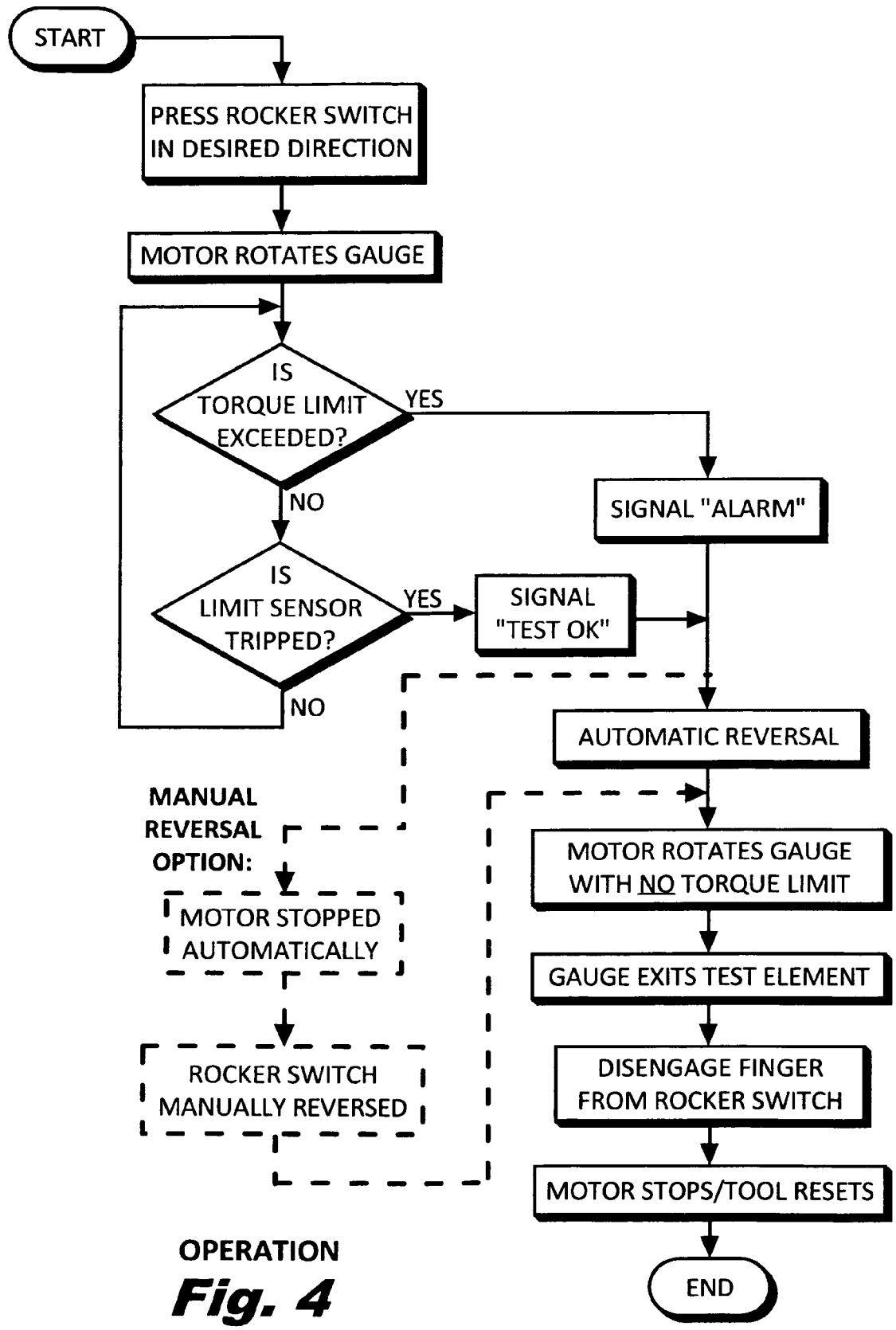
FIG. 4 is a high level operational flow chart of the thread inspection tool.

The flow chart of FIG. 4 describes the normal procedure for using the thread inspection tool of this invention. It is presumed that the torque limit for the usage had been previously set. Operation starts by pressing the rocker switch in the desired rotation direction. It remains pressed during the entire procedure. When the motor starts, the gauge is placed in the blind hole or onto the stud to be tested and the rest of the procedure is automatic until the finger is released from the rocker switch. Torque is monitored during the forward motion by monitoring the current draw of the motor. If the limit is exceeded, an alarm signal (such as a buzzer) is sounded and the spindle is automatically reversed so as to turn in a direction opposite to that of the still pressed rocker switch. Alternatively, the switch is used manually for reversal after being alerted by the alarm and stopping automatically (this is shown in dashed lines in FIG. 4). The reverse direction is engaged with no torque limit. If the depth limit is encountered before any torque limit is detected, an indication of "test OK" is given (flashing light) while proceeding to an automatic reversal to withdraw the thread gauge.

Figure 5:
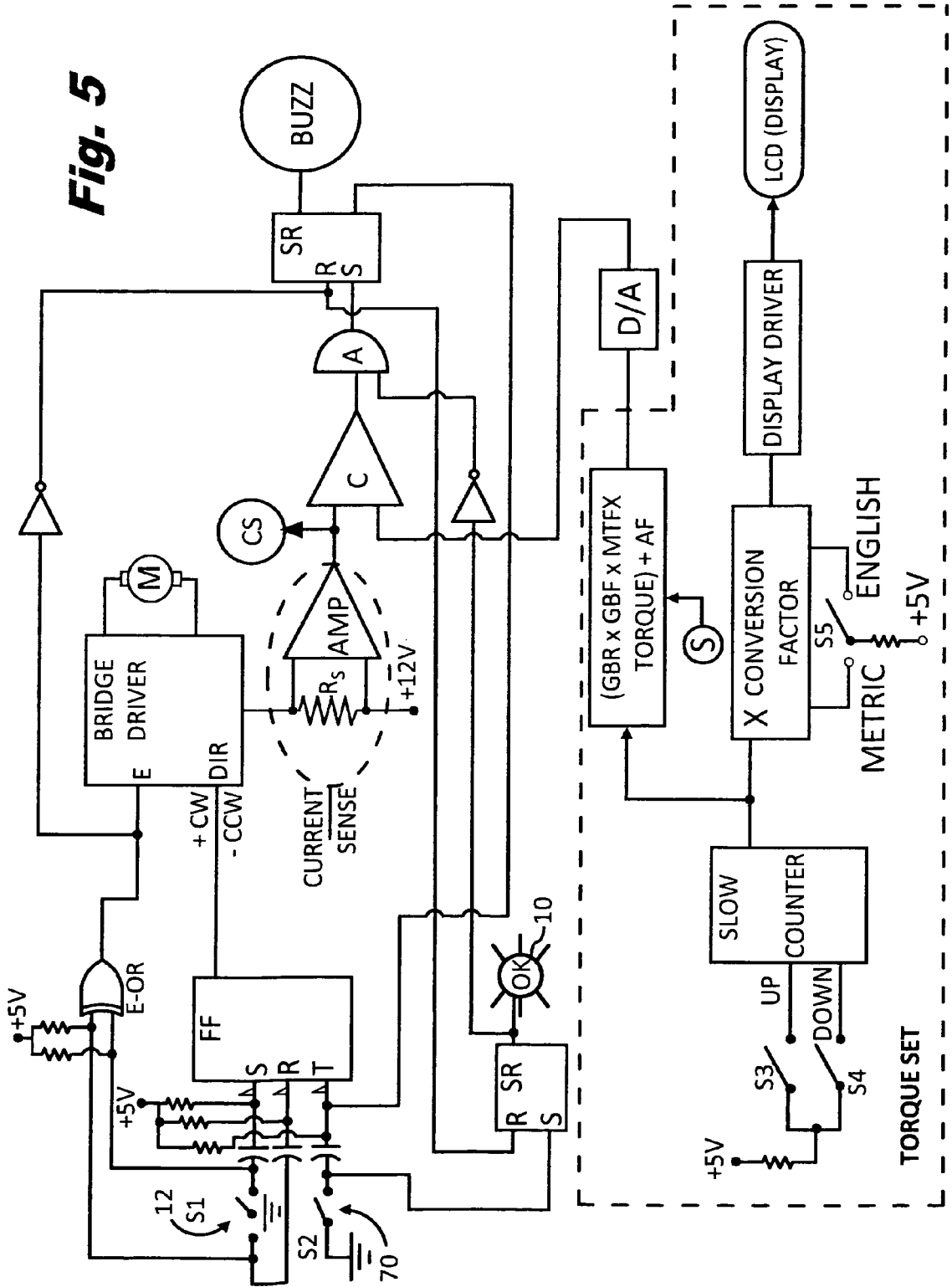
FIG. 5 is a logic flow diagram showing hardware features which can also be implemented in software using a microcomputer.

FIG. 5 is a logic diagram showing the preferable details of the tool operation and torque setting as if discrete hardware logic modules were used. A more cost effective and compact implementation would substitute software routines to implement equivalent logic manipulations using a single chip appliance class microcomputer. Rocker switch S1 (also shown as 12 previously) determines the direction setting of the bridge motor driver (a bulkier relay can also be used) while an exclusive OR detecting either direction engagement of switch S1 keeps the bridge driver enabled. A flip flop (FF) with set/reset/toggle inputs stores the current direction setting of the motor. The capacitors coupling the inputs insure that only initial pulses are considered. Considering only the depth limit switch S2 (previously 70), motor keeps operating in the same direction until S2 is closed which causes FF to toggle the direction input of the bridge driver thereby reversing the motor. Separately, a set/reset (SR) latch stores the fact that S2 had been closed (at least momentarily) and indicates this fact by lighting flashing light "OK" or 10. In the meantime, torque output is being monitored via the voltage across resistor Rs in series with motor supply lead (12V). This is amplified and compared with a voltage previously set representing the voltage of the desired torque limit. (Note that a Hall effect current measuring device can be used instead of the sense resistor.) If this limit is exceeded prior to switch S2 having been closed, comparator C sets a set/reset (SR) latch which sets a buzzer as a problem indicator while also keeping toggle input of FF in the low (engaged) position; the latter reverses the spindle motor and prevents further over-torque detections from interfering. Some details such as inhibits and resets have not been discussed.

The torque setting portion of FIG. 5 involve the optional use of momentary switch buttons S3 and S4 which are protected by cover 14. These cause a slow counter to cycle up or down displaying the desired torque at the spindle output on a liquid crystal display in either metric (N-M) or English units such as oz-in as set by slide switch S5. The count output "torque" is input to an algorithm solver along with known constants for gear box ratio (GBR), gear box friction factor (GBF), motor torque factor MTF, and an additive factor (AF) related to no-load current. The output is a digital value of the motor current related to the desired torque limit. This is then passed through a D/A converter to convert it to a properly scaled analog voltage for comparison in an analog comparator.

FIG. 6 is a crossectional detail showing an optional electronics board 75 with switches and display facing transparent cover 14 and components on the back side. Board 75 is attached through a hatch in the wall of housing 6. Flexible polyimide board extensions 76 can provide much more area to accommodate more electronic components thereby using the enclosed area around shaft 67 effectively.

Figure 7:
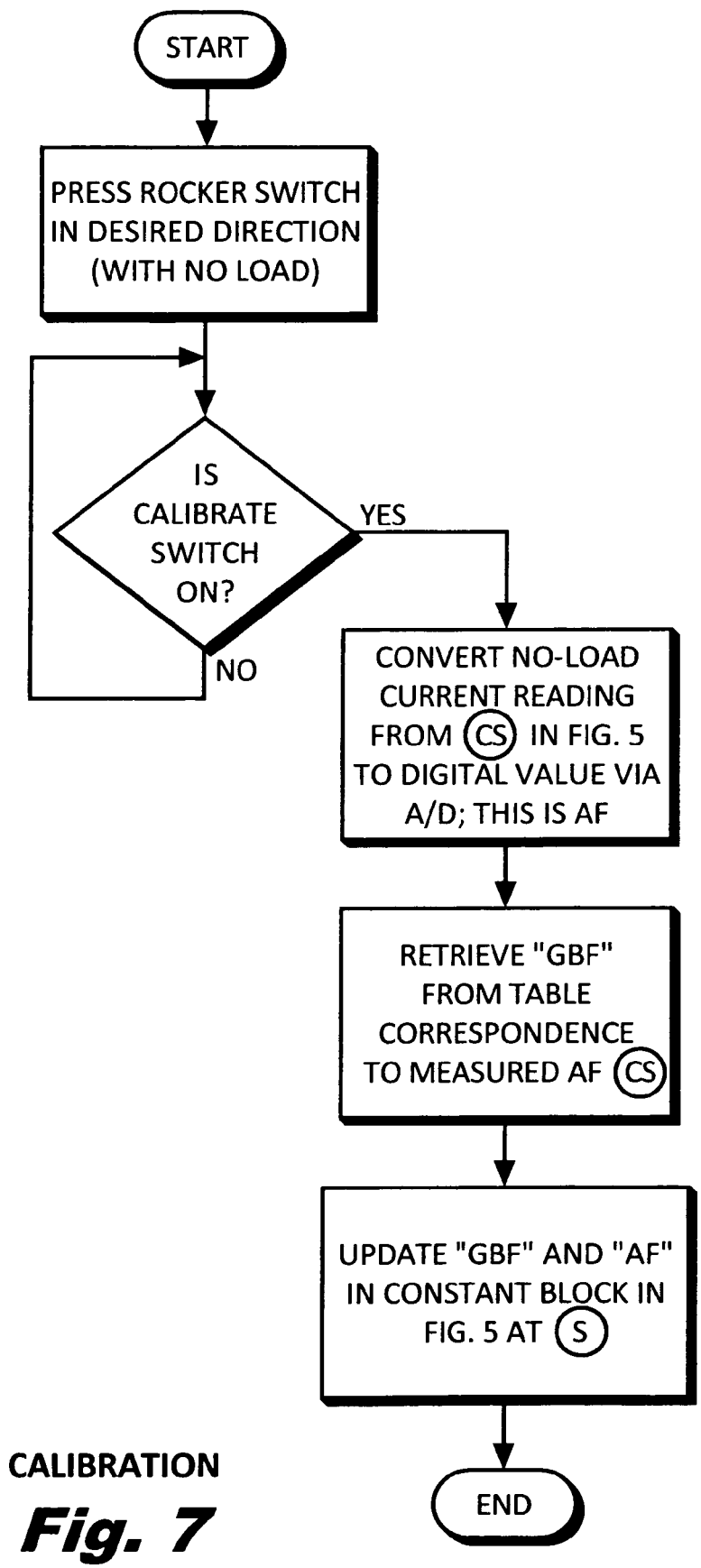
FIG. 7 is a high level flow chart of a field calibration procedure.

FIG. 7 is a flow chart showing the procedure for field calibration. This is an alternate embodiment which would be warranted only if a very wide range of desired torque limits are required in the inspection tool. This feature improves the accuracy of torque limit settings especially important for the low end of settings. It can compensate for changes in the gear box including tooth wear and loss of lubricant, or temperature variations. The operation is started by operating the rocker switch in the desired direction while the calibrate switch is on. The idea is to obtain an actual no-load current reading which can be obtained from point CS in FIG. 5. This is then converted to a digital value and becomes factor AF in the algorithm. A table of empirical values of factor GBF related to different values of AF is stored within each thread inspection tool. New value AF is used to enter the table whereby a more accurate new value of GBF is retrieved. Both the newly obtained values of AF and GBF are then inserted as constants in the algorithm solver block (at S in FIG. 5).

Figure 8:
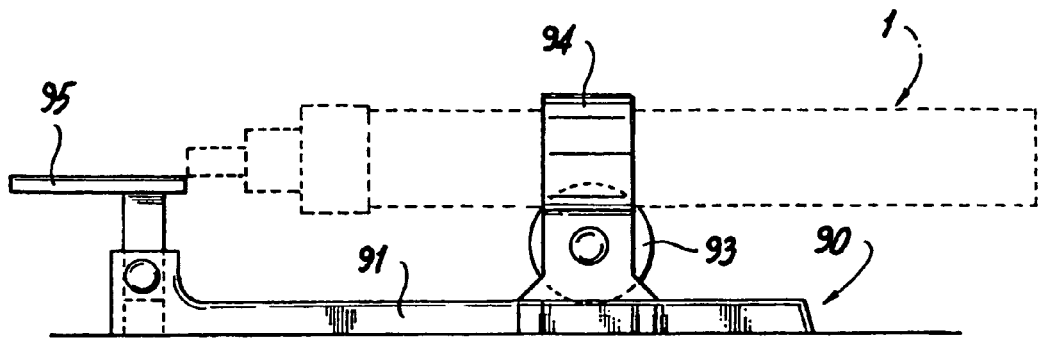
FIG. 8 is a side elevation of the table mount accessory showing the position of the thread inspection tool within the mount in dashed lines.
Figure 9:
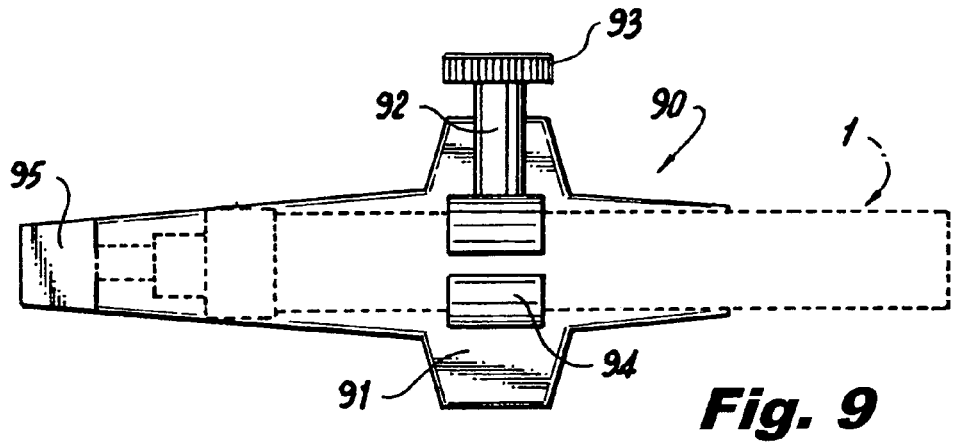
FIG. 9 is a top view of the table mount of FIG. 8.
Figure 10:
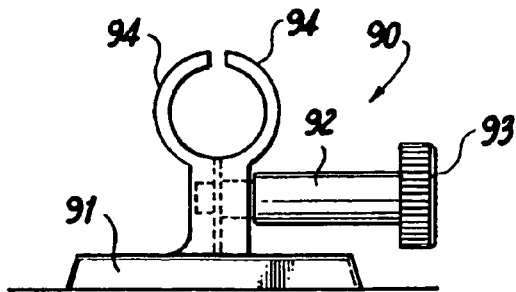
FIG. 10 is a back end view of the table mount accessory with no inspection tool in place.

An accessory table mount 90 is shown in three orthogonal views in FIGS. 8-10. It converts thread inspection tool 1 from a hand-held unit to one that can be conveniently used on a table or bench top. Table mount 90 has base 91, threaded shaft 92 with knob 93 at its distal end, split clamp 94, and adjustable front rest 95. In operation, with clamp 94 loosened, thread inspection tool 1 is inserted through the circular opening and secured by tightening shaft 92 via knob 93. Tool 1 is positioned so that its front end is in registration laterally and above adjustable rest 95 which is intended to be of aid in supporting the unit under test.

Figure 11:
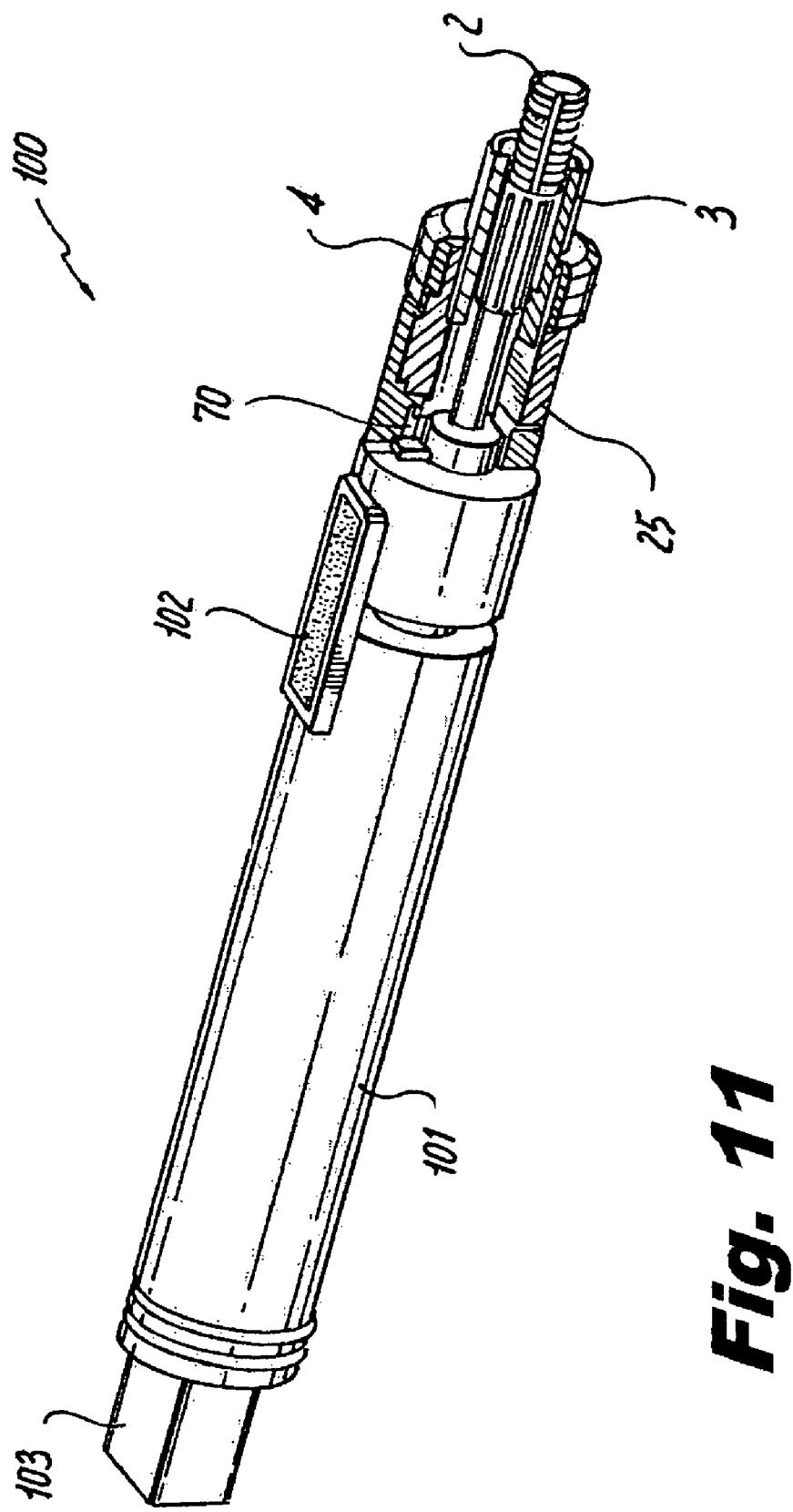
FIG. 11 is a perspective view with a partial front end cut-away of an alternate mechanical clutch embodiment of the thread gauge of this invention.
Figure 12:
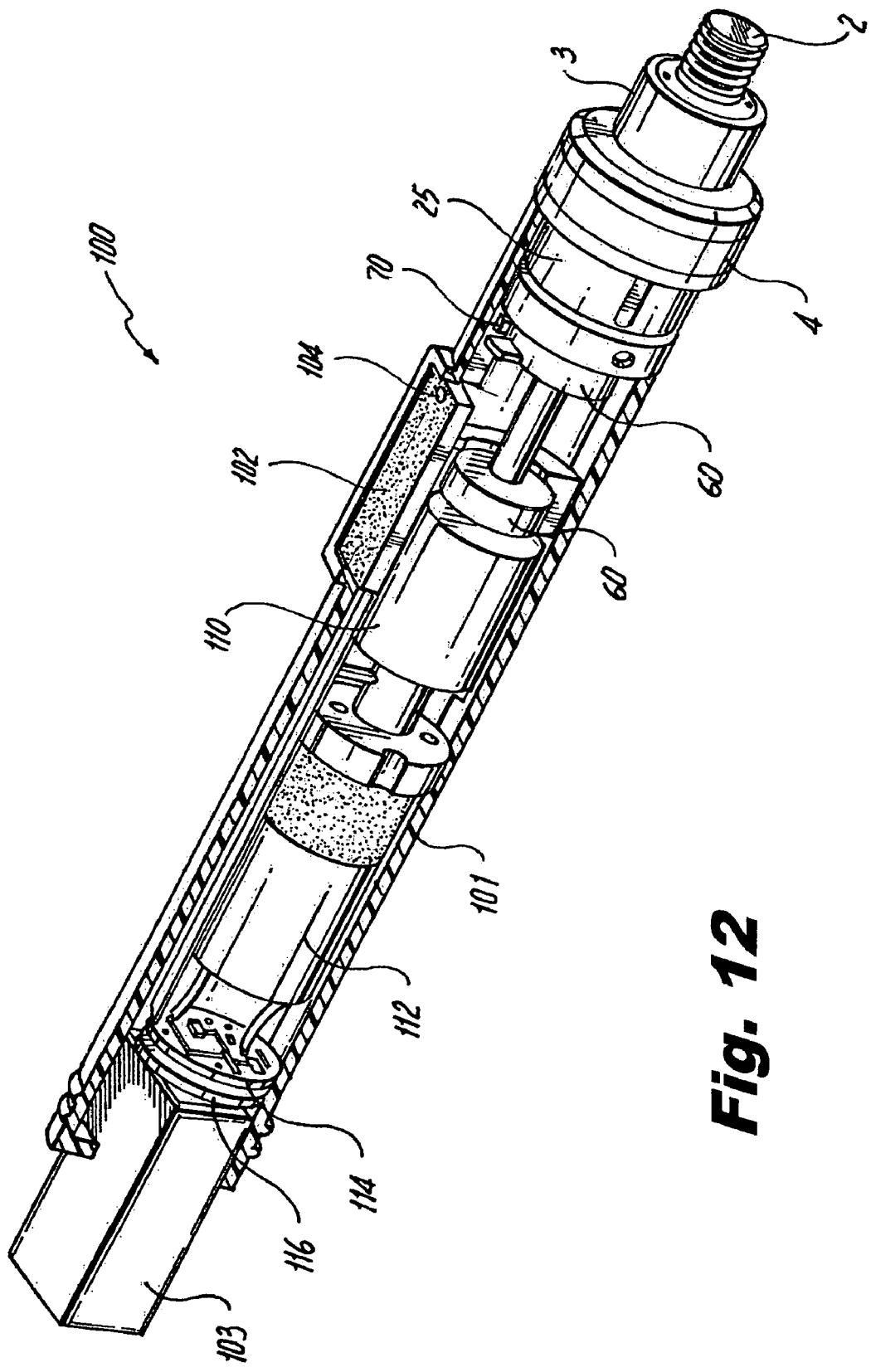
FIG. 12 is a perspective cut-away showing the internal components of the thread gauge with a mechanical clutch shown in FIG. 11; and, FIG. 13 is a flow chart describing the operation of the alternate embodiment thread gauge with a mechanical clutch.
Figure 13:
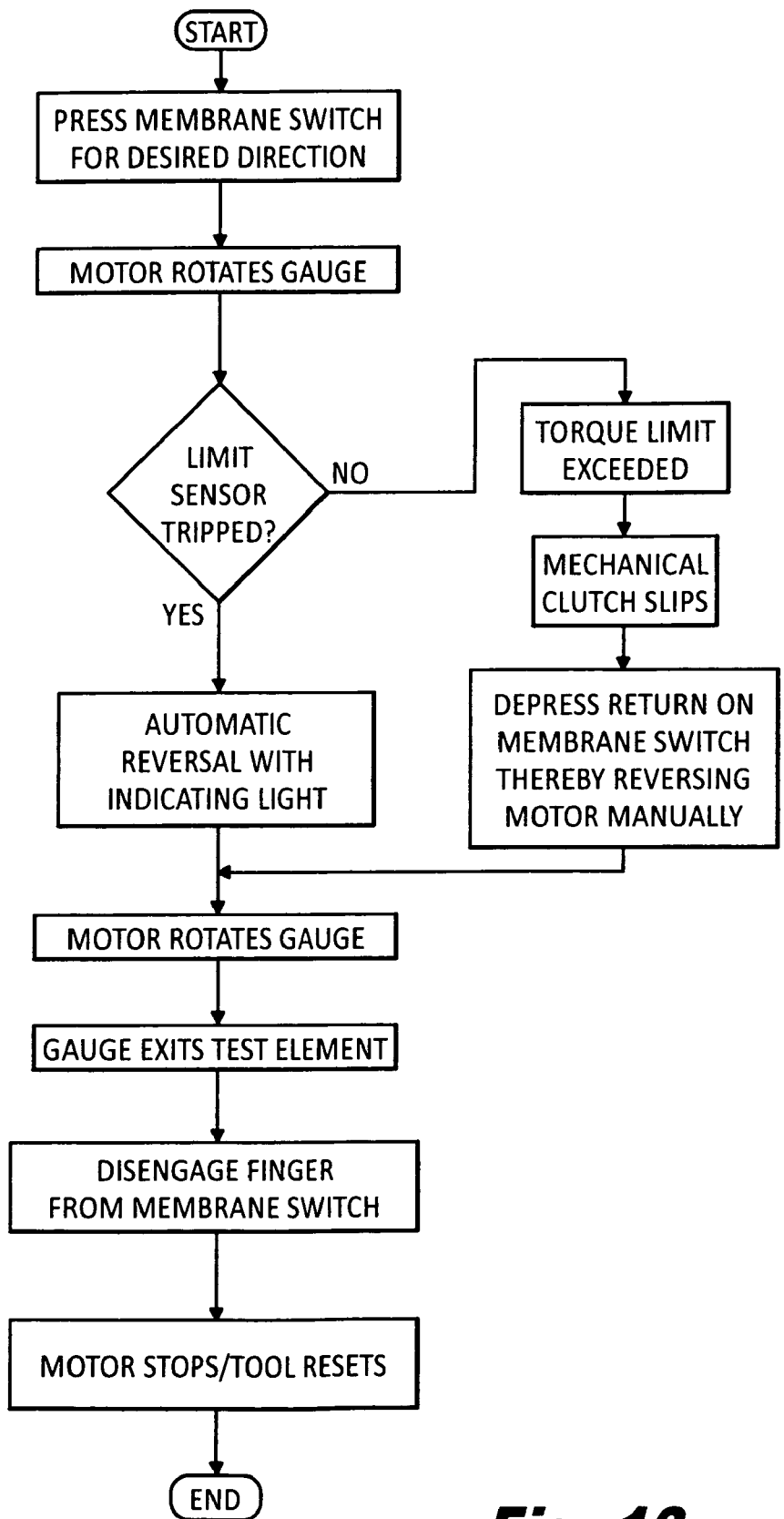

FIGS. 11-13 relate to an alternate mechanical clutch embodiment of the compact ergonomic thread gauge of this invention. All of the components and operation of the depth adjusting subsystem (see FIG. 2) of the previous embodiment have been incorporated into the front end of this alternate embodiment. This embodiment, however, relies on a mechanical adjustable torque limiting clutch to adjust and limit the torque applied to the thread gauge.

FIG. 11 shows thread inspection tool 100 with thread gauge 2 at the front end, depth limit collar 3, lock nut 4, internal sleeve 25, and reversing switch 70 which are part of the depth adjusting subsystem. Housing 101 contains all the major components. Battery 103 at the distal end is used to power the thread inspection tool. Membrane switch 102 has a clockwise and a counterclockwise activation element. Indicator 104, typically an LED, is lighted when the inspection tool enters the automatic reversal phase when the depth limit is encountered.

FIG. 12 shows more of the major internal components such as bearings 60, torque limiting clutch 110, motor 112, PC board 114, and battery board 116.

The flow chart of FIG. 13 describes the operation of the alternate embodiment. The operation starts when the desired element of membrane switch 102 is pressed; this starts thread gauge 2 rotation. If the limit switch 70 is tripped, indicating light 104 is turned on simultaneously with the reversal of motor 112. After thread gauge 2 exits the test element, the operator should release finger from the membrane switch to reset the tool. Note that operation will stop at any point if the finger is released from the membrane switch element; this is a safety feature. The membrane switch incorporates two normally open elements either of which must be continually pressed for operation.

If the torque limit is exceeded before the limit sensor (switch 70) is tripped, the mechanical torque clutch slips. This is evident to the operator. At this point the operator will move his finger to the alternate membrane switch element to perform a manual reversal of the thread gauge to withdraw it from the test element.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A thread inspection tool comprising:
   a portable, compact held elongated housing having a distal end and a proximate end;
   a thread gauge protruding from said distal end of said housing;
   means for setting a length limit of said thread gauge extending from said distal end of said housing;
   a drive for said thread gauge comprising an electric motor in said housing and a coupling between said motor and said thread gauge;
   means for monitoring torque produced by said electric motor as said gauge is driven into a blind hole or onto a stud; and
   means for displaying an indicator and automatically reversing direction of rotation of said thread gauge when said setting of length limit is reached.

2. The thread inspection tool of claim 1 in which said torque is monitored by an adjustable mechanical clutch to limit the torque applied to the thread gauge.

3. The thread inspection tool of claim 1 in which said housing includes a collar threaded into the distal end of said housing, said thread gauge being mounted within said collar and fixed along a longitudinal axis of said housing, whereby said length of thread gauge protruding out of said housing is set by manual rotation of said collar.

4. The thread inspection tool of claim 3 in which said collar is part of a sub-system mounted in said distal end of said housing, said sub-system being movable along said longitudinal axis of said housing and biased in a forward direction toward said distal end of said housing, said housing having a sensor which detects when said sub-system overcomes said bias and is moved rearwardly a predetermined distance indicating that said thread gauge no longer has forward movement because said thread gauge has moved fully into said blind hole or onto said stud.

5. The thread inspection tool as in claim 4 wherein said sensor is a snap action switch.

6. The thread inspection tool as in claim 4 wherein said sensor is an optical sensor.

7. The thread inspection tool as in claim 4 wherein said sensor is a Hall effect switch.

8. The thread inspection tool of claim 1 in which said housing contains a battery as a power source for said motor.

9. The thread inspection tool of claim 8 in which said housing has a socket for recharging said battery or for operating said motor.

10. The thread inspection tool of claim 1 in which said coupling between said motor and thread gauge includes a spindle having a coupling, said thread gauge comprising a thread portion and a coupling portion, said coupling portion of said thread gauge being engaged with said spindle coupling in such a manner that said thread gauge is readily replaceable with a different thread gauge.

11. The thread inspection tool as in claim 1 wherein said housing is hand-held.

12. The thread inspection tool as in claim 1 wherein said tool is mounted upon a countertop support.

13. The thread inspection tool as in claim 12 wherein said countertop support comprises a base having a clamp receiving said housing of said thread inspection tool, said clamp have a tightening means locking said thread inspection tool in place; said base further having an adjustable rest in positional registration with a front end of said thread inspection tool supporting a threaded unit under test.

14. The thread inspection tool of claim 1 in which said motor is a DC permanent magnet gear motor.

15. The thread inspection tool of claim 4 in which said collar moves said subsystem by impinging upon a machine part in non-rotating contact.

\* \* \* \* \*